(12) United States Patent
Gelfenbeyn et al.

(10) Patent No.: US 11,231,826 B2
(45) Date of Patent: Jan. 25, 2022

(54) ANNOTATIONS IN SOFTWARE APPLICATIONS FOR INVOKING DIALOG SYSTEM FUNCTIONS

(71) Applicant: Google Inc., Mountain View, CA (US)

(72) Inventors: Ilya Gennadyevich Gelfenbeyn, Sunnyvale, CA (US); Artem Goncharuk, Mountain View, CA (US); Pavel Aleksandrovich Sirotin, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 812 days.

(21) Appl. No.: 15/063,855

(22) Filed: Mar. 8, 2016

(65) Prior Publication Data

US 2016/0259767 A1 Sep. 8, 2016

Related U.S. Application Data

(60) Provisional application No. 62/129,879, filed on Mar. 8, 2015.

(51) Int. Cl.
*G06F 16/332* (2019.01)
*G06F 3/0481* (2013.01)
(Continued)

(52) U.S. Cl.
CPC .............. *G06F 3/0481* (2013.01); *G06F 8/20* (2013.01); *G06F 16/3329* (2019.01);
(Continued)

(58) Field of Classification Search
CPC ............. H04M 2201/40; H04M 3/493; H04M 3/4936; H04N 21/4782; G06F 17/241; G06F 17/3061; G06F 16/90332; G06F 16/58; G06F 16/683; G06F 16/907; G06F 40/169; G06F 3/167; G06F 16/90335; G06F 16/904; G06F 40/284; B60R 25/257; G10L 2015/223; G10L 15/26; G10L 17/22; G10L 15/22; G10L 15/183; H04L 67/22; H04L 12/1813; G06Q 50/01; G06Q 30/0201; G06Q 30/0241; G06N 20/00; G06N 5/02; G01C 21/3608; Y10S 707/99933
(Continued)

(56) References Cited

U.S. PATENT DOCUMENTS 8,265,925 B2 * 9/2012 Aarskog ............... G06F 17/271
704/1
9,338,493 B2 * 5/2016 Van Os .................... G06F 16/73
(Continued)

*Primary Examiner* — Alex Gofman
*Assistant Examiner* — Linh Black
(74) *Attorney, Agent, or Firm* — Middleton Reutlinger

(57) ABSTRACT

A method for expanding software application functionalities processing is disclosed herein. The method comprises receiving a user request within a software application. The software application is enhanced with annotations, which include metadata. The method continues with loading the metadata from the annotations to a dialog system located on a remote device, sending at least a part of the user request to the dialog system, and receiving a dialog system response to the user request from the dialog system. At least one of the annotations associated with the dialog system response is identified. A code associated with the identified annotation is invoked within the software application.

18 Claims, 11 Drawing Sheets

(51) Int. Cl.
  *G06F 8/20* (2018.01)
  *G06F 40/35* (2020.01)
  *G06F 3/16* (2006.01)
  *G06F 8/30* (2018.01)

(52) U.S. Cl.
  CPC .............. *G06F 40/35* (2020.01); *G06F 3/167* (2013.01); *G06F 8/31* (2013.01)

(58) Field of Classification Search
  USPC .. 707/E17.068, E17.139, E17.101, E17.102, 707/E17.103, 621, 707–708, 759, 771, 707/796, 805
  See application file for complete search history.

(56) References Cited

U.S. PATENT DOCUMENTS

| | | | | |
|---|---|---|---|---|
| 9,697,822 | B1* | 7/2017 | Naik | G10L 15/063 |
| 10,001,904 | B1* | 6/2018 | Geller | G11B 27/34 |
| 10,276,170 | B2* | 4/2019 | Gruber | G10L 17/22 |
| 2002/0184401 | A1* | 12/2002 | Kadel, Jr. | G06F 8/76 |
| | | | | 719/315 |
| 2003/0093790 | A1* | 5/2003 | Logan | G11B 27/34 |
| | | | | 725/38 |
| 2008/0140623 | A1* | 6/2008 | Tien | G06F 16/3325 |
| 2009/0030697 | A1* | 1/2009 | Cerra | G10L 15/30 |
| | | | | 704/275 |
| 2009/0306981 | A1* | 12/2009 | Cromack | G06F 16/685 |
| | | | | 704/235 |
| 2010/0070448 | A1* | 3/2010 | Omoigui | H01L 27/1463 |
| | | | | 706/47 |
| 2010/0123737 | A1* | 5/2010 | Williamson | G06T 15/20 |
| | | | | 345/672 |
| 2010/0293190 | A1* | 11/2010 | Kaiser | G06F 3/048 |
| | | | | 707/769 |
| 2011/0054899 | A1* | 3/2011 | Phillips | G10L 15/30 |
| | | | | 704/235 |
| 2011/0161341 | A1* | 6/2011 | Johnston | G06F 16/90332 |
| | | | | 707/766 |
| 2012/0158472 | A1* | 6/2012 | Singh | G06F 16/29 |
| | | | | 705/14.4 |
| 2012/0159391 | A1* | 6/2012 | Berry | A61B 5/4824 |
| | | | | 715/823 |
| 2012/0236201 | A1* | 9/2012 | Larsen | H04N 21/439 |
| | | | | 348/468 |
| 2012/0278073 | A1* | 11/2012 | Weider | G10L 15/1815 |
| | | | | 704/235 |
| 2013/0185657 | A1* | 7/2013 | Gunawardena | G06F 16/48 |
| | | | | 715/753 |
| 2014/0039916 | A1* | 2/2014 | Barden | G06F 19/363 |
| | | | | 705/2 |
| 2014/0075281 | A1* | 3/2014 | Rubin | G06F 17/241 |
| | | | | 715/230 |
| 2014/0098949 | A1* | 4/2014 | Williams | H04M 3/42195 |
| | | | | 379/265.09 |
| 2014/0355600 | A1* | 12/2014 | Lawson | H04M 1/2473 |
| | | | | 370/352 |
| 2015/0049163 | A1* | 2/2015 | Smurro | H04N 7/15 |
| | | | | 348/14.08 |
| 2015/0058324 | A1* | 2/2015 | Kauwe | G06F 16/284 |
| | | | | 707/722 |
| 2015/0195406 | A1* | 7/2015 | Dwyer | G10L 15/26 |
| | | | | 379/265.07 |
| 2016/0012465 | A1* | 1/2016 | Sharp | G06Q 20/384 |
| | | | | 705/14.17 |
| 2017/0006135 | A1* | 1/2017 | Siebel | H04L 69/40 |
| 2017/0329466 | A1* | 11/2017 | Krenkler | G06F 40/30 |
| 2017/0331772 | A1* | 11/2017 | Stillabower | H04L 51/04 |

* cited by examiner what is the weather in @city:city

User says what is the weather in [_____] — 810 weather forecast for [____]

How's the weather in New York?

What's the weather forecast for [_____] [_____] — 820

Add user expression...

+ Add

Action weather

| PARAMETER NAME | VALUE | DEFAULT VALUE |
|---|---|---|
| date | [$date] ← Aliases are referenced in action — 830 | Enter default value... |
| city | $city | Enter default value... |
| Enter name... | Enter value... | Enter default value... |

+ New parameter

Generate variations

Fulfillment — *Aliases are referenced in fulfillment speech string*

[Looking up weather forecast for $city] — 840

*FIG. 8*

ANNOTATIONS IN SOFTWARE APPLICATIONS FOR INVOKING DIALOG SYSTEM FUNCTIONS

CROSS-REFERENCE TO RELATED APPLICATIONS

The present utility patent application is related to and claims priority benefit of the U.S. provisional application No. 62/129,879, filed on Mar. 8, 2015, under 35 U.S.C. 119(e), which is incorporated herein by reference in its entirety for all purposes to the extent that such subject matter is not inconsistent herewith or limiting hereof.

TECHNICAL FIELD

This disclosure relates generally to software optimization techniques and more particularly to systems and methods for simplifying software application coding, where software applications include or communicate with a dialog system.

BACKGROUND

Currently, dialog systems are widely used in the information technology industry, especially in the form of mobile applications for cell phones and tablet computers. A dialog system can include a computer-based agent having a human-centric interface for accessing, processing, managing, and delivering information. Dialog systems are also known as chat information systems, spoken dialog systems, conversational agents, chatter robots, chatterbots, chatbots, chat agents, digital personal assistants, automated online assistants, and so forth. All these terms are within the scope of the present disclosure and referred to as a "Dialog System" for simplicity.

Traditionally, a dialog system interacts with its users in natural language to simulate an intelligent conversation and provide personalized assistance to the users. For example, a user may generate requests to the dialog system in the form of conversational questions, such as "What is the weather like in Palo Alto?" and receive corresponding answers from the dialog system in the form of audio and/or displayable messages. The users may also provide voice commands to the dialog system requesting the performance of certain functions including, for example, generating e-mails, making phone calls, searching particular information, acquiring data, navigating, requesting notifications or reminders, and so forth. These and other functionalities make dialog systems very popular as they are of great help, especially for holders of portable electronic devices such as smart phones, cellular phones, tablet computers, gaming consoles, and the like.

Although the demand for dialog systems for third party mobile applications and web services is constantly growing, it is not an easy task to create a well-operating dialog system. Each dialog system has a dialog system interface and dialog system engine. The dialog system interface is responsible for receiving user inputs and delivering dialog system responses to the user. The dialog system engine is responsible for transforming voice user inputs into text inputs, interpreting text inputs, and generating corresponding responses to text inputs. The process running on the dialog system engine is also known as natural language processing (NLP). Development of NLP models is not only time consuming, but is also a highly technical task. Accordingly, application developers may struggle to develop a dialog system for integrating its functionality with a mobile application or web service. Accordingly, there is a need in the art to simplify the process of creating, developing, and maintaining dialog systems for software applications and web services.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present technology provides for an online platform configured to maintain Dialog System Engines that can process user requests acquired via software applications installed on user devices. The present technology also allows the software developers to annotate certain dialog system functions in a source code of their software applications in a separate development environment (i.e., without the need to code dialog system functions). The annotations and dialog descriptors, which are either built into or provided with software application code, when invoked, cause Dialog System Interfaces to implement desired dialog system functions with respect to certain user inputs and deliver dialog system responses to end users. This significantly simplifies the design process of software applications, thereby allowing the software developers to integrate one or more dialog system functions into software applications without dedicating time and resources for developing and maintaining dialog systems. This also allows obtaining a dialog support for software applications deployed in particular application environments. For example, iOS and Android applications can receive a dialog support defined in the application and enabled when the application is deployed on a device.

In accordance with various embodiments of the present disclosure, software developers may insert annotations in the form of metadata within software source code during design time. Alternatively, developers can use pre-built annotations to insert annotations into compiled dialog definitions during design time. In yet more embodiments, annotations can be also uploaded or synchronized with an online platform. Further, the metadata is used later at load time to specify which dialog system functions will be implemented when the program runs, based on one or more criteria. In this way, the annotations allow deferring implementations of certain dialog system functions and building dialog systems when the actual software package is already created.

At runtime, the user device running the Dialog System Interface receives user requests. The user requests are used to identify and invoke annotations integrated into the code of software applications. The user device, through a particular Dialog System Interface, implements one or more dialog system functions based on invoked annotations and generates dialog system responses based on the annotations.

Provided is a method for expanding software application functionalities. The method may commence with receiving a user request within a software application. The software application may be enhanced with annotations. The annotations may include metadata. The method may further include sending the user request to a dialog system located on a remote device. The dialog system may send a dialog system response to the user request. Upon receiving the dialog system response, at least one of the annotations associated with the dialog system response may be identified. Based on the identification, a code may be invoked within the software application. The code may be associated with the identified annotation.

Additional objects, advantages, and novel features will be set forth in part in the detailed description, which follows, and in part will become apparent to those skilled in the art upon examination of the following detailed description and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and, in which:

FIG. 8 shows an example rule for receiving a weather forecast, in accordance with some example embodiments.

DETAILED DESCRIPTION

Figure 1:
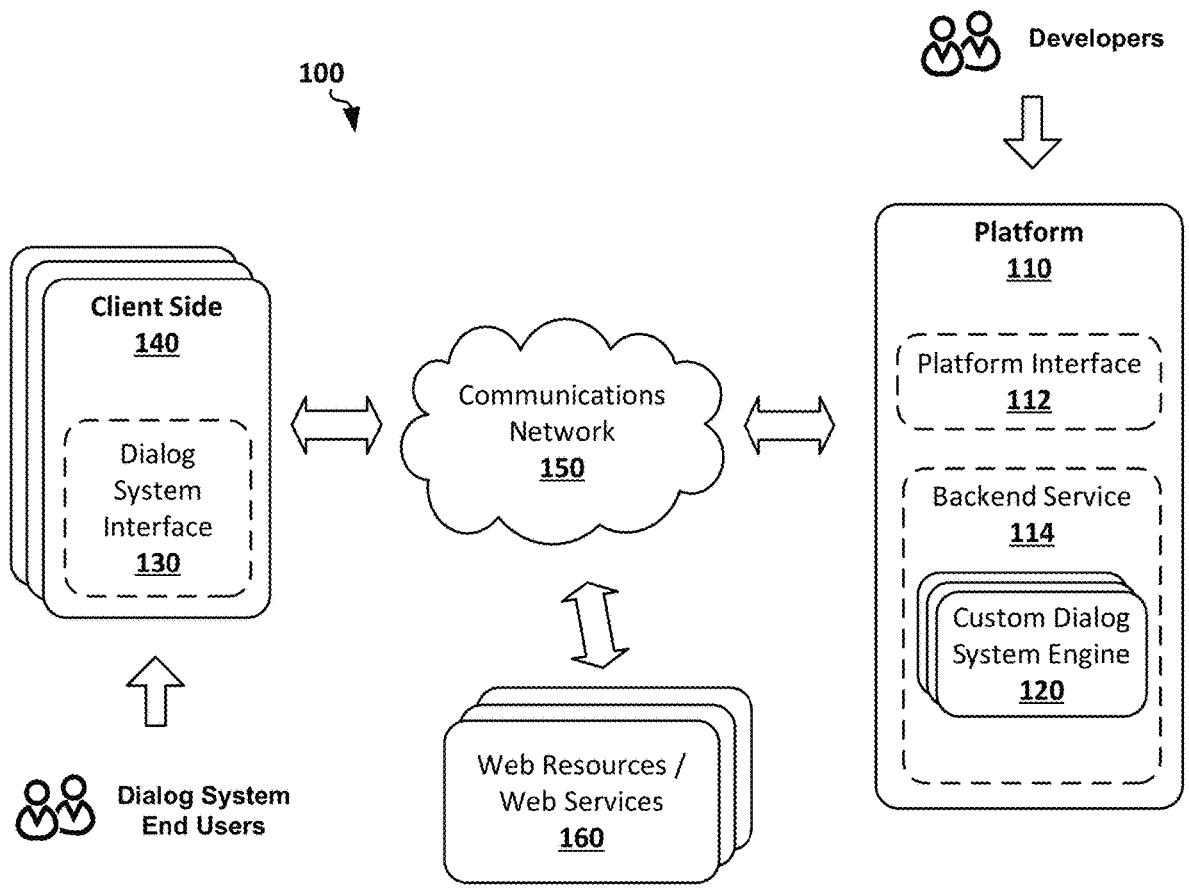
FIG. 1 illustrates an environment within which systems and methods for expanding software application functionalities can be implemented, in accordance with some embodiments.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter.

The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Present teachings may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a transitory or non-transitory storage medium such as a disk drive or computer-readable medium. It should be noted that methods disclosed herein can be implemented by a computer (e.g., a desktop computer, tablet computer, laptop computer), game console, handheld gaming device, cellular phone, smart phone, smart television system, and so forth.

The term "software developer" or simply "developer" refers to one or more of the following: software developer, mobile application developer, application developer, software engineer, software owner, mobile application owner, software manager, mobile application manager, dialog system owner, and so forth. A developer develops and/or manages a Dialog System Engine, Dialog System Interface, and/or software applications.

The term "Dialog System" refers to one or more of the following: chat information system, spoken dialog system, conversational agent, chatter robot, chatterbot, chatbot, chat agent, digital personal assistant, automated online assistant, and so forth. Each Dialog System includes a "Dialog System Interface" and a "Dialog System Engine." Each of these elements can be customized by the developer.

The term "Dialog System Interface" refers to a computer-human interface, which is configured to acquire user inputs in the form of audio messages or text messages, and deliver dialog system responses to the users in the form of audio messages or displayable messages. In one example, a Dialog System Interface may be implemented as a widget designed for or integrated with, a software application, mobile application, middleware application, firmware application, website, and web service, to provide a computer-human interface for acquiring user requests and delivering dialog system outputs to the users. In this disclosure, Dialog System Interfaces can be virtual, meaning that they include one or more annotations only.

The term "Dialog System Engine" refers to a software application configured to process user inputs and generate responses thereto. In one example, Dialog System Engine refers to a computer-enabled or processor-enabled system for supporting an associated Dialog System Interface by processing user requests and generating corresponding responses thereto.

The term "annotation" refers to syntactic metadata that can be added to the source code of a software application. Annotations can invoke implementation of certain dialog system functions by Dialog System Engines and/or Dialog System Interfaces at runtime. Annotations can include or be associated with one or more criteria, parameters, variables, classes, methods, and/or packages. Annotations can also include or be associated with one or more user inputs such as text inputs or speech inputs. In various embodiments, developers can add annotations in the form of dialog metadata to a source code of particular software applications. One example of annotations is Java annotations, although other means for other programming languages and platforms can be used. In yet other embodiments, annotations can include codes that define dialog system specific behaviors with a software application under development.

The present technology provides for a platform enabling creation of custom Dialog System Engines serving as back-end services for Dialog System Interfaces. Dialog System Interfaces can be implemented at least as a part of various software applications, mobile applications, middleware applications, firmware applications, websites, web services, and so forth. In other words, Dialog System Interfaces are on a client side (in the user device or in a cloud or web service) and provide a computer-human interface configured to at least acquire user inputs and deliver dialog system outputs to the users. Dialog System Engines, on the other hand, support the Dialog System Interfaces by processing user inputs and generating corresponding responses thereto. Thus, a Dialog System Engine and Dialog System Interface, when interacting with each other, form a Dialog System. One may refer to a Dialog System Interface running on or accessed from a user device as a "frontend" user interface, while a Dialog System Engine, which supports the operation of such Dialog System Interface, can be referred to as a "backend" service.

The platform, according to various embodiments of the present disclosure, allows software developers to create custom Dialog System Engines that will support frontend Dialog System Interfaces. For example, if a software developer wants to integrate Dialog System functionality into a mobile application as an additional feature, the developer can use the platform to create and deploy a custom Dialog System Engine and link it with or embed it into the mobile application. The mobile application, in turn, will have only a Dialog System Interface. In this example, the Dialog System Interface can be activated by a user when he interacts with the mobile application. The user can make inquiries to the Dialog System Interface in the form of voice inputs or text inputs. Upon receipt of a user inquiry, the Dialog System Interface can transfer the user inquiry with little or no pre-processing to the linked custom Dialog System Engine, which was previously created using the platform. The Dialog System Engine processes the received user inquiry, interprets it, and generates a response to the inquiry based on predetermined rules and settings. Predetermined rules and settings can be either defined by developers (i.e., they include specific dialog scenarios, entities, etc.), or built into the platform (e.g., provided via embeddable Software Development Kit (SDK) or a cloud solution). The response is then delivered to a mobile application for further visual or audio presentation to the user. In some embodiments, the response may include a response text to be delivered to the user and/or metadata with instructions for the user device to perform an action (e.g., open a browser, access certain data online, run a particular application, etc.). In some embodiments, the response may include data (e.g., in the case of a web service call). In other embodiments, the response may include a callback Uniform Resource Locator (URL) that the Dialog System Interface or user device needs to access to obtain a response text and/or metadata.

According to various embodiments of this disclosure, interaction between a Dialog System Interface and Dialog System Engines can be implemented with the help of annotations. Software developers can insert custom or predetermined annotations into a code of a software application such that, at runtime, the annotations invoke implementation of certain dialog system functions by Dialog System Engines. This may include transmittance of user inputs, various parameters, variables, metadata, and, optionally, other data by the software application to a Dialog System Engine. In response to an invoking request caused by an annotation, the Dialog System Engine processes the user input and optionally other data, generates a dialog system response, and delivers the same to the software application. Accordingly, software coding becomes a much easier task for software developers when the code is expanded by adding annotations invoking various dialog system functionalities.

The methods of this disclosure enable developers to specify dialog system elements in the form of annotations right in a code during a design phase, instead of defining the dialog system elements separately. This also allow deferring implementation of certain dialog system functions until the runtime of software applications by invoking annotations integrated into code of software applications.

The benefits of methods of this disclosure can be evident from the following example. Assume a software developer creates a new mobile application having an interface with a number of buttons, each of which implements certain functions. One of the buttons causes the activation of a built-in camera, makes a picture, and stores the same in a memory. This functionality can be specified in a software code using a programming language. If the developer needs to enable activation of the camera and making the picture in response to a user's speech input, such as "Shoot," "Take a picture," "Smile" (i.e., without pressing the button), the developer needs to code a dialog system procedure, which is a complex task to accomplish. The present technology allows the developers in these instances to introduce custom or predetermined annotations into a source code of software applications to invoke implementation of dialog system functions by certain Dialog System Interfaces. In the above example, the developer simply needs to insert a predetermined annotation, such as @CameraAction, into the software code to expand functionalities of the mobile application by adding the desired dialog system procedure. In this way, when the user of the mobile application says "Shoot," "Take a picture," "Smile," or another predetermined word or phrase, it invokes the annotation to implement a particular Dialog System function. As a result of the processing, the Dialog System Engine generates a dialog system response in the form of at least one processor-implementable instruction that causes the user device to activate the camera, make a picture, and store the same in the memory. In some embodiments, annotations includes a full specification for an intent rather than a link to the intent or the intent's identifier such as "aCameraAction". When an annotation includes the full specification, a conversational agent can be dynamically created for the mobile application. In other embodiments, annotations may include more complex dialog system definitions available in an online platform. For example, annotations can include, but are not limited to, system and developer-defined entities, dialog trees, and fulfillment routines.

In general, Dialog System Interfaces can be integrated or be an integral part of a wide range of software applications running on a user device, such as a personal computer (PC) or cellular phone, or on a server so that dialog systems become a part of a website or web service. Dialog System Engines can be implemented on a server such that their functionalities can be accessible to Dialog System Interfaces over the Internet, cellular networks, or any other communications means.

FIG. 1 shows a high-level block diagram of example system environment 100 suitable for practicing the present technologies. As shown on this figure, there is provided a platform 110 for creating and maintaining custom Dialog System Engines. For these ends, the platform 110 includes a platform interface 112 for creating custom Dialog System Engines and backend service 114 for maintaining and running custom Dialog System Engines 120.

Platform interface 112 may include a graphical user interface (GUI) embedded into a webpage and accessible by application developers via the Internet. In other embodiments, however, platform interface 112 may be implemented as a software application such as a downloadable software application or any other software, middleware, or firmware running on or accessible from an electronic device such as a computer. In the example shown in FIG. 1, platform interface 112 is realized as a web accessible GUI, as will be described below. For simplicity, this disclosure is limited to such embodiments where platform interface 112 is a server-based solution so that it is accessible via the Internet. Regardless of a particular implementation, platform interface 112 enables the developers, through a number of GUI tools, to create one or more custom Dialog System Engines 120.

Still referencing FIG. 1, backend service 114 is responsible for maintaining and running custom Dialog System Engines 120 that are created, for example, by or with the help of platform interface 112. Backend service 114 may operate as a web service providing functionality to custom Dialog Systems by enabling Dialog System Interfaces 130 to interact with custom Dialog System Engines 120 maintained at backend service 114 of platform 110.

As discussed above, Dialog System Interfaces 130 can be provided on a client side 140. Dialog System Interfaces 130 may be as simple as a GUI enabling users to make inquiries, which are then delivered to backend service 114 for processing by corresponding Dialog System Engines 120, and to receive responses to the inquires generated by Dialog System Engines 120. Dialog System Interfaces 130 may be implemented at least as a part of a software application, mobile application, middleware application, or firmware application, web service, website, and so forth. In various embodiments, Dialog System Interfaces 130 include one or more annotations integrated into software code.

Still referencing FIG. 1, client side 140 may refer to, but is not limited to, a user device, terminal, computing device (e.g., laptop computer, tablet computer, desktop computer), cellular phone, smart phone, gaming console, remote control, multimedia system, smart television device, set-top box, infotainment system, in-vehicle computing device, informational kiosk, robot, and so forth. In these embodiments, Dialog System Interfaces 130 are a part of software, middleware, or firmware installed on such devices.

In additional embodiments, client side 140 may refer to a networked or online solution such as a server, hosting service, web service, web site, cloud service, and so forth. For example, Dialog System Interface 130 can be a widget or GUI provided on one or more web pages enabling end users to make inquiries and get responses thereto. This option is suitable for those instances when a developer, for example, wants to integrate a Dialog System into a website to provide enhanced customer service.

As can be seen in FIG. 1, the interaction between Dialog System Interfaces 130 and corresponding Dialog System Engines 120 is performed via a communications network 150. Communications network 150 may include one or more of the Internet, intranet, cellular network, local area network (LAN), wide area network (WAN), IEEE 802.11 based network, and so forth.

FIG. 1 also shows various third party web resources/services 160 provided via one or more web servers. These third party web resources/services 160 can provide information of various types to Dialog System Engines 120 or Dialog System Interfaces 130 as part of a response to a user request. For example, web resources/services 160 may refer to email services, weather services, navigation services, and the like. Accordingly, if a user makes the inquiry "What is the weather like today?," such information may be automatically acquired by Dialog System Engine 120 from one or more third party web resources/services 160 and then integrated into a dialog system response to be delivered to the end user.

Figure 2:
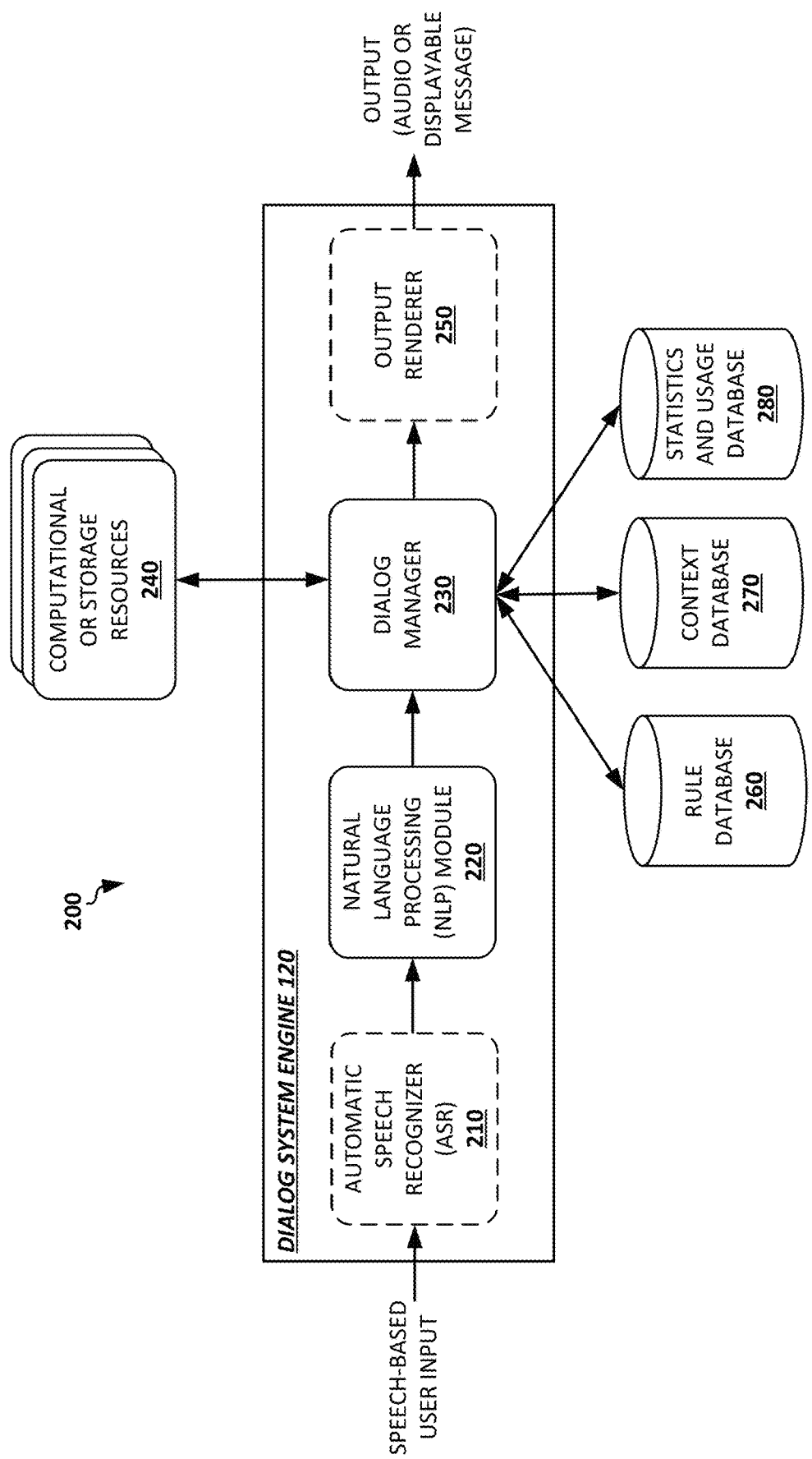
FIG. 2 is a block diagram showing various modules of a dialog system engine, in accordance with certain embodiments.

FIG. 2 shows a high-level architecture 200 of an exemplary Dialog System Engine 120, according to an example embodiment. It should be noted that each module of Dialog System Engine 120 or associated architecture includes hardware components, software components, or a combination thereof. Dialog System Engine 120 may be embedded or installed in a user device or server, or may be presented as a cloud computing module and/or a distributed computing module.

In the embodiment shown, Dialog System Engine 120 includes an Automatic Speech Recognizer (ASR) 210 configured to receive and process speech-based user inputs into a sequence of parameter vectors. ASR 210 further converts the sequence of parameter vectors into a recognized input (i.e., a textual input having one or more words, phrases, or sentences). ASR 210 includes one or more speech recognizers such as a pattern-based speech recognizer, free-dictation recognizer, address book based recognizer, dynamically created recognizer, and so forth.

Further, Dialog System Engine 120 includes NLP module 220 for understanding spoken language input. Specifically, NLP module 220 may disassemble and parse the recognized input to produce utterances, which are then analyzed utilizing, for example, morphological analysis, part-of-speech tagging, shallow parsing, and the like. NLP module 220 may then map recognized input or its parts to meaning representations.

Dialog System Engine 120 further includes dialog manager 230, which coordinates the activity of all components, controls dialog flows, and communicates with external applications, devices, services, or resources. Dialog manager 230 may play many roles, which include discourse analysis, knowledge database query, and system action prediction, based on the discourse context. In some embodiments, dialog manager 230 may contact one or more task managers (not shown) that may have knowledge of specific task domains. In some embodiments, dialog manager 230 may communicate with various computing, logic, or storage resources 240, which may include, for example, a content storage, rules database, recommendation database, push notification database, electronic address book, email or text agents, dialog history database, disparate knowledge databases, map database, points of interest database, geographical location determiner, clock, wireless network detector, search engines, social networking websites, blogging websites, news feeds services, and many more. In some embodiments, computational or storage resources 240 include one or more web resources/services 160 discussed above.

Dialog manager 230 may employ multiple disparate approaches to generate outputs in response to recognized inputs. Some approaches include the use of statistical analysis, machine-learning algorithms (e.g., neural networks), heuristic analysis, and so forth. Dialog manager 230 is one of the central components of Dialog System Engine 120. The major role of dialog manager 230 is to select the correct system actions based on observed evidences and inferred dialog states from the results of NLP (e.g., dialog act, user goal, and discourse history). In addition, dialog manager 230 should be able to handle errors when the user input has ASR and NLP errors caused by noises or unexpected inputs.

Dialog System Engine 120 may further include output renderer 250 for transforming the output of dialog manager 230 into a form suitable for providing to the user. For example, output renderer 250 may employ a text-to-speech engine or may contact a pre-recorded audio database to generate an audio message corresponding to the output of dialog manager 230. In certain embodiments, output renderer 250 may present or cause to present the output of dialog manager 230 as a text message, an image, or a video message for further displaying on a display screen of the user device. In some example embodiments, output renderer 250 can constitute at least a part of Dialog System Interface 130.

Still referring to FIG. 2, Dialog System Engine 120 includes one or more dialog system rules maintained in at least one rule database 260. Dialog System Engine 120 may also include or be associated with one or more context databases 270, which maintain a plurality of context description elements such as lists of terms, keywords, phrases, expressions, context variables, and context parameters (e.g., geolocation, system rate, GUI, etc.) associated with one or more dialog system rules. In other words, context databases 270 include information supporting the process of determining conversational or environmental context for particular user requests.

Dialog System Engine 120 may also include or be associated with one or more statistics and usage databases 280, which are configured to aggregate statistical or usage information associated with the operation of Dialog System Engine 120 and/or associated Dialog System Interface 130 and/or associated mobile or software application. For example, statistics and usage database 280 may accumulate dialog system logs, which can be later used for optimization of dialog system rules, dialog system responding schemes, training machine-learning algorithms if employed by Dialog System Engine, and so forth.

The process of creating and operating custom Dialog System Engines 120 will now be described with reference to FIG. 1 and other drawings. In particular, platform interface 112 provides one or more GUIs having a number of tools enabling developers to create and customize one or more dialog system elements, which serve as a basis for a custom Dialog System Engine.

According to various embodiments, dialog system elements include "entities" and "intents." Each entity may refer to a number of objects having the same or similar characteristics. In other words, entities are lists of terms and/or keywords defining objects of one class. In one example, an entity may refer to a keyword and a set of its synonyms. In another example, an entity may refer to a keyword and a set of its definitions. In yet another example, an entity may refer to a list (e.g., a list of cities, list of names, list of titles, list of brands, list of street names, etc.).

In some embodiments, each entity can have a title. For example, one entity can be titled as "city" and it will contain a list of cities such as Arlington, Boston, Chicago, and so forth. In other embodiments, an entity can be titled as a keyword and it can contain synonyms and/or definitions of this keyword. In one example, the entity called "music" may include the terms of song, singer, singing, musician, and so forth. In another example, the entity called "artist" may include a list of music bands, music ensembles, or music artists. In another example, the entity called "Beatles" may include a list of possible synonyms, such as "The Beatles," "Beatles," "Fab Four," "Liverpool Legends," "John Lennon," and so forth. In yet another example, there can be an entity called "Artist" which may include various artist names, artist name synonyms, music band names, and so forth.

In some embodiments, Dialog System Engines may include a number of default, pre-configured entities and/or intents. These can include common types of entities or intents related to such concepts as time, date, location, and the like. For example, when a developer creates a new Dialog System Engine, it may already have a few entities of common types such as a "@System.Date" entity. This entity covers linguistic constructs related to particular dates and may include the following terms: "today," "tomorrow," "next week," "January 1," "January 1 of next year," "next Monday," "the following Monday," and so forth.

Further, each intent of a Dialog System Rule includes a dialog system interaction scheme, which provides a particular relation between at least one user request and at least one dialog system linguistic response or fulfilment response. The dialog system interaction scheme can be represented by a rule based on a relationship between a particular action and at least one entity. Actions generally relate to formalized software objects such as JSON (JavaScript Object Notation) objects causing at least one processor to generate linguistic or fulfilment responses associated with at least one entity. Accordingly, each intent can be represented as a logical relation between at least one action and at least one entity object, for example, as follows:

a) [Action] @[Entity]
  b) [Action] @[Entities]
  c) [Actions] @[Entity]
  d) [Actions] @[Entities]
  e) Text @[Entity]
  f) Text @[Entities]
  g) Text @[Entity] Text
  h) [Action] Text @[Entity]

The procedures e) through h) mean that particular information in the form of text is provided with respect to a particular Entity. For example, the user request "Create a meeting with John at 1 p.m. tomorrow, please" may be presented as the following pattern: create a meeting @sys.any:subject @sys.date-time. Here, @sys.any:subject refers to an entity associated with a particular name, @sys.date-time refers to an entity associated with time and date, and the phrase "Create a meeting" refers to a predetermined action to be performed by Dialog System Interface or Dialog System Engine with a certain mobile application, software application, or web service.

The procedures e) through h) mean that particular information in the form of text is provided with respect to a particular Entity. For example, the user request "Create a meeting with John at 1 p.m. tomorrow, please" may be presented as the following pattern: [Action] Text @[sys.date-time] Text. Here, @[sys.date-time] refers to an entity associated with time and date, while the phrase "Create a meeting" refers to a predetermined action to be performed by Dialog System Interface 130 or Dialog System Engine 120 with a certain mobile application, software application, or web service. Element "Text" refers to content and not entity nor intent.

As mentioned above, a dialog system rule causes generation of a linguistic response and/or fulfilment response as an answer to a user request. One example of a linguistic response may include particularized content deliverable as an audio message or displayable message. Fulfilment responses refer to particular processor-executable instructions for one or more software applications, middleware, firmware, web services, and the like that cause implementation of a particular action. Some examples of fulfilment responses may include scheduling an event in a calendar mobile application, writing and sending a text message or email, searching for content at a web search service, building a route in a navigational software application, and so forth. In certain embodiments, at least some linguistic responses and/or fulfilment responses can be configured by developers. In other embodiments, at least some linguistic responses and/or fulfilment responses can be pre-configured and be available as default responses.

In certain additional embodiments, developers can provide example requests to illustrate intents and entities instead of providing "entities" and "intents." In these embodiments, platform 110 automatically determines, using machine-learning techniques, what "entities" and "intents" are implied in example user requests and creates corresponding rules. For example, a developer may simply provide example requests, such as "Play Beatles" and "I'd like to listen to Madonna," and platform 110 will match "Beatles" and "Madonna" to existing entities (system's or user's) and generate corresponding "[Action] @[Entity]" rules automatically.

Thus, developers can use platform interface 112 to generate a plurality of dialog system rules specific to a particular application or industry. These pluralities of entities and intents form dialog system rules (also referred to as dialog system elements) and enable custom Dialog System Engines to perform certain actions or generate certain outputs in response to a wide range of end user inputs.

Figure 3:
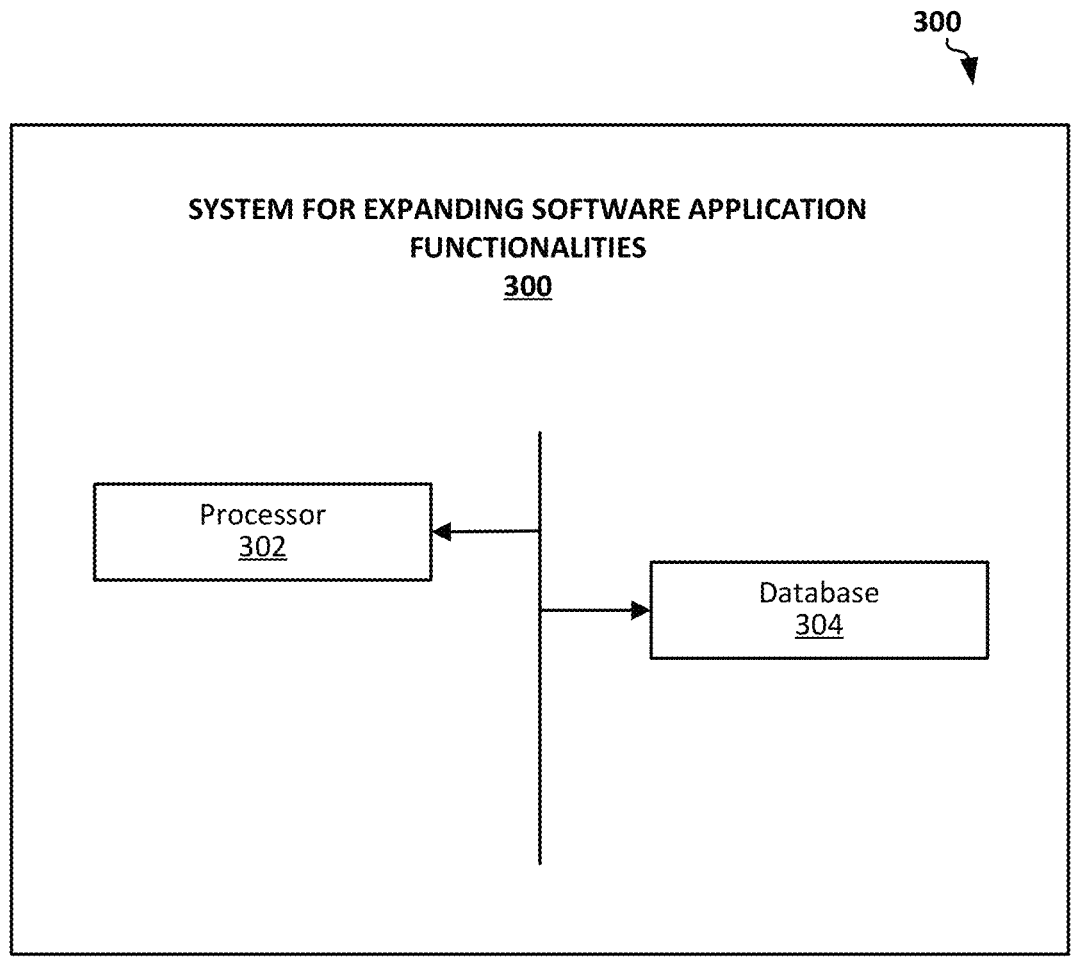
FIG. 3 is a block diagram of a system for expanding software application functionalities, in accordance with some example embodiments.

FIG. 3 is a system 300 for expanding software application functionalities. Specifically, the system 300 may include a processor 302 and a database 304 in communication with the processor 302. The database 304 may include computer-readable instructions for execution by the processor 302.

The processor may be operable to receive a user request within a software application. In an example embodiment, the software application is associated with a user device. The software application may be enhanced with annotations that may include metadata. The enhancing of the software application with annotations may include integrating the annotations into a code associated with the software application. In example embodiments, the annotations may be pre-built annotations, annotations uploaded from a remote resource, annotations synchronized with an online resource, and so forth. Optionally, in an example embodiment, the processor 302 may be operable to load the metadata from the annotations to the dialog system. Therefore, the dialog system may include metadata of all annotations, by which the software application associated with the user device is enhanced. Upon receipt of the user request, the processor 302 may send at least a part of the user request to a dialog system located on a remote device.

The processor 302 may be further operable to receive a dialog system response to the user request from the dialog system. In an example embodiment, the dialog system response may include one or more of a displayable message, an audio message, an incentive for the user to provide a further user request, an instruction for the software application to perform a predetermined function, and so forth. The dialog system response may include a callback URL to be accessed by the software application to obtain a text of the dialog system response or at least one of the annotations associated with the dialog system response.

Upon receipt of the dialog system response, the processor 302 may identify at least one of the annotations associated with the dialog system response to obtain an identified annotation. Based on the identification, the processor 302 may invoke a code within the software application. The code may be associated with the identified annotation. In an example embodiment, the code may include an instruction for one or more of the following: a further software application associated with the user device, a server, a hosting service, a web service, a web site, and a cloud service.

Figure 4:
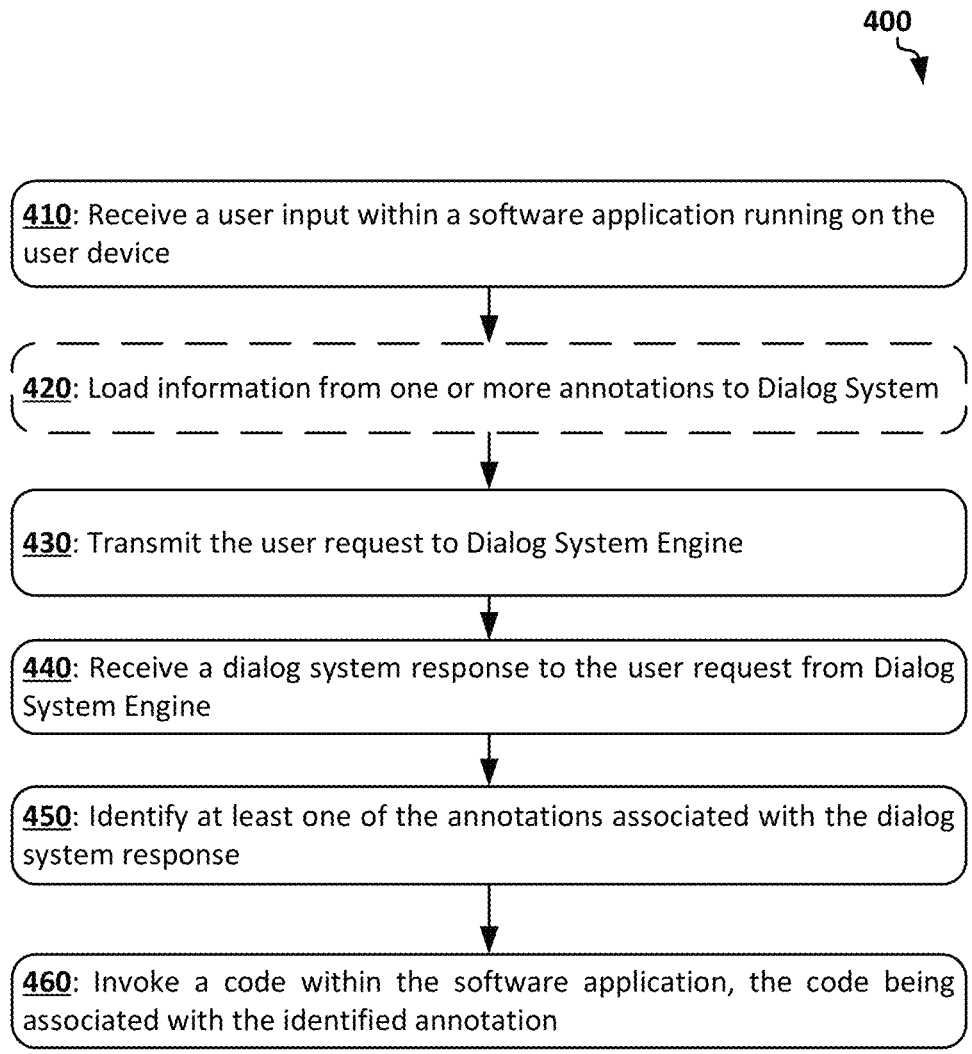
FIG. 4 is a flow chart illustrating a method for expanding software application functionalities, in accordance with some example embodiments.

FIG. 4 is a process flow diagram showing method 400 for expanding software application functionalities at runtime, according to an example embodiment. The method may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of a platform for creating and maintaining custom Dialog System Engines. Notably, the below recited steps of method 400 may be implemented in an order different than described and shown in FIG. 4. Moreover, method 400 may have additional steps not shown herein, but which can be evident for those skilled in the art from the present disclosure. Method 400 may also have fewer steps than outlined below and shown in FIG. 4.

Method 400 commences at operation 410 with a user device receiving a user input within a software application running on the user device. As discussed above, the software application is enhanced with one or more annotations, which include metadata linking certain functions of the dialog system with functions of the software application. In general, the annotations can be used for various purposes. First, the annotations can define types of requests that the software application should or could handle by voice or text. More specifically, the annotations may define at least a type of the user request and the user request may be processed by the dialog system based on the type of the user request. In this example, the annotations can define entities, intents, and/or actions. Second, the annotations can define fulfilment of intents. In this example, the annotations could define code within the software application that needs to be invoked when an action is triggered within the dialog system. Third, the annotations can define runtime information and user specific information that may be propagated to the dialog system and used in matching.

At operation 420, during runtime of the software application, the user device optionally loads information from one or more annotations to the Dialog System employed on the platform (e.g., information is loaded to the Dialog System Engine). The loaded information may include metadata concerning intents, entities, actions, contexts, and/or fulfillments indicating which of the action should be taken when the intent is executed. In some embodiments, the loaded information may include certain variables, parameters, and other data that can be involved in processing by a dialog system of the user request.

At operation 430, the user device transmits the user request to the platform (i.e., to the Dialog System Engine).

At operation 440, the user device receives a dialog system response to the user request from the Dialog System Engine. The dialog system response can include a displayable or audio message, or an instruction causing the user device to perform a certain action.

At operation 450, the user device identifies at least one of the annotations associated with the dialog system response (i.e., triggered intent and action).

At operation 460, the user device invokes a code within the software application, which code is associated with the identified annotation.

In some embodiments, method 400 can be used for compilation of a dialog agent during design time and loading of the compiled dialog definition to the dialog system. Alternatively, method 400 can be used for compilation for embedded use only. In other words, the software application could define a dialog interface. When the software application is built, dialog definitions will be compiled and embedded into this application. The software application could run the dialog interface with no connection to the dialog system (i.e., in a completely embedded mode).

Figure 5:
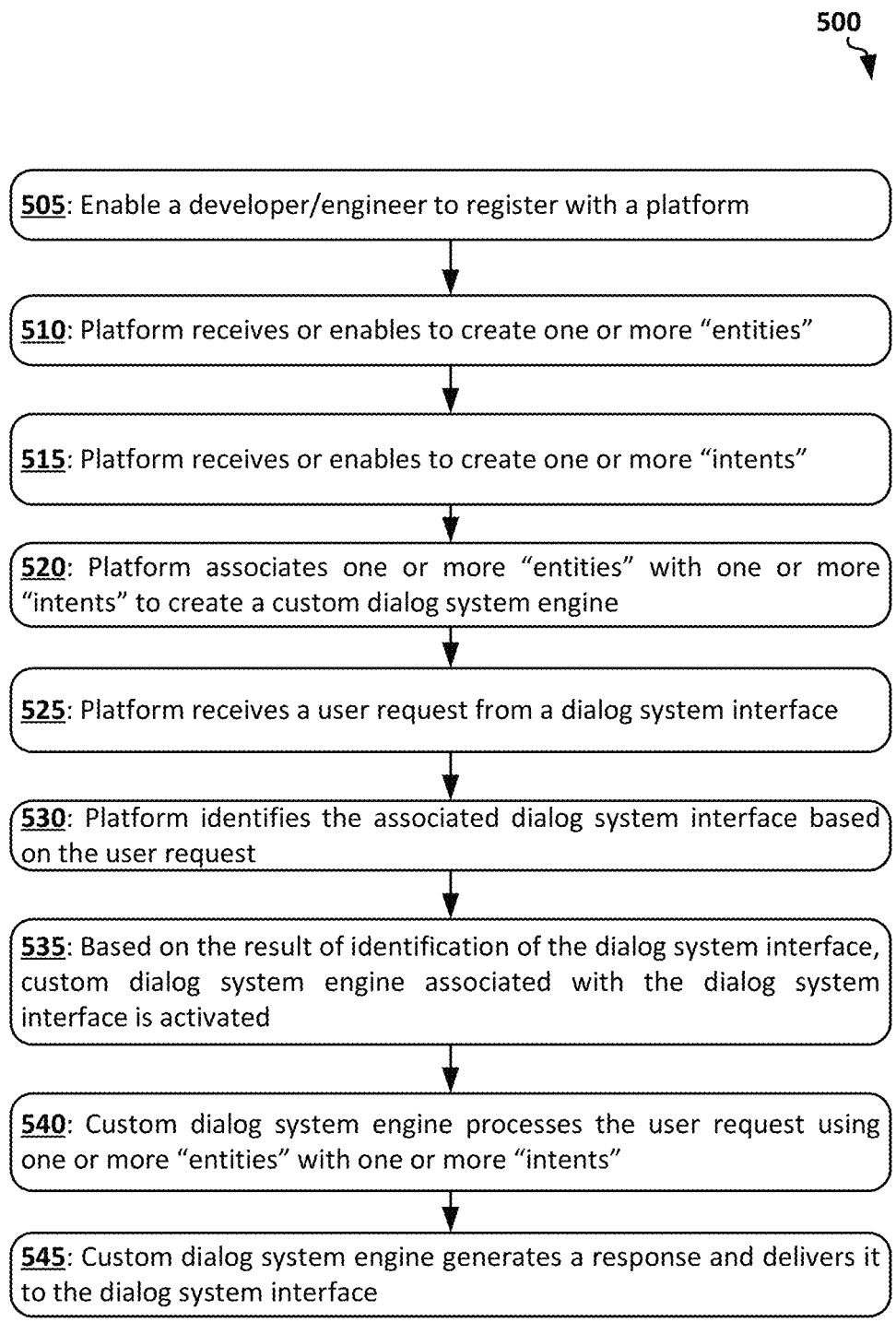
FIG. 5 shows a process flow diagram for a method of creating custom dialog system engines, in accordance with some example embodiments.

FIG. 5 is a process flow diagram showing method 500 for creating custom Dialog System Engines using platform 110 and for operating platform 110, according to an example embodiment. The method may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of platform 110. Notably, the below recited steps of method 500 may be implemented in an order different than described and shown in FIG. 5. Moreover, method 500 may have additional steps not shown herein, but which can be evident for those skilled in the art from the present disclosure. Method 500 may also have fewer steps than outlined below and shown in FIG. 5.

At operation 505, a developer registers with platform 110. For these ends, the developer shall interact with platform interface 112. The registration may include creating a developer profile, which can be maintained by platform 110. The developer profile may link (associate) a custom Dialog System Engine 120 of this developer and one or more Dialog System Interfaces 130 deployed on the client side. More specifically, a developer profile may include multiple agents (such as custom dialog system engines) and each of them could be integrated into a client application with the help of SDK. Accordingly, there can be multiple end-points for user input (Dialog System Interfaces). The communication between Dialog System Engines 120 and Dialog System Interfaces 130 may include Application Programming Interface (API) codes, rules for interaction, destination addresses, and many more.

At optional operation 510, platform 110 receives from the developer one or more entities and stores the same in a local database. In some embodiments, the entities are not received, but created by the developer using web tools of platform interface 112. In yet other embodiments, entities are not created or received at all and, therefore, some dialog system engines, or dialog system engine rules may not have any entities.

At operation 515, platform 110 receives from the developer one or more intents and stores the same at the local database. In some embodiments, the intents are not received, but created by the developer using tools of platform interface 112. As described above, the intents are associated with the entities, and together they form dialog system elements (custom rules enabling Dialog System Engine 120 to generate responses tailored for specific needs).

At operation 520, platform 110 associates one or more entities with one or more intents to create (form) custom Dialog System Engine 120. Dialog System Engine 120 is associated with one or more Dialog System Interfaces 130 of the developer.

Operations 505-520 illustrate a set-up process for the custom Dialog System Engine 120, while the following operations 525-545 illustrate the operation of custom Dialog System Engine 120. FIGS. 6-9 illustrate various screenshots of platform interface 112, which show the process of manually creating entities (see FIG. 6), manually creating intents (see FIGS. 7, 8), and a test console for testing dialog system elements (see FIG. 9) by developers.

Once all dialog system elements of custom Dialog System Engine 120 are created, they are maintained as a backend service and enable any of the associated Dialog System Interfaces 130 to provide the full functionality of the Dialog System to users according to predetermined settings.

Referring back to FIG. 5, at operation 525, platform 110 receives a user request from an unidentified Dialog System Interface 130. The user request can be a voice input or text input. In some embodiments, Dialog System Interface 130 can pre-process the user input, for example, by recognizing spoken words and transforming the voice input into text input. In other embodiments, however, no pre-processing is performed by Dialog System Interface 130.

At operation 530, platform 110 processes the user request and identifies Dialog System Interface 130. For these ends, the user request can be accompanied by an identifier (ID) at the time the user request is sent from Dialog System Interface 130 to platform 110. Generally, identifiers here may refer to (a) a user ID, which can be used to retrieve a developer's or end-user's profile; (b) a session ID, which can be used to retrieve current dialog context between the given end user and the Dialog System Engine; and (c) a set of keys/agents (i.e., custom dialog system IDs), which can be used to identify entities, intents, and other data associated with the user request.

At operation 535, based on the result of the identification at operation 530, platform 110 activates Dialog System Engine 120 associated with identified Dialog System Interface 130. At the same operation, platform 110 may also retrieve or identify one or more dialog system elements (i.e., one or more entities and one or more intents) based on the result of the identification at operation 530.

At operation 540, Dialog System Engine 120 processes the user request using identified dialog system elements (i.e., one or more entities and one or more intents) as retrieved at operation 535. Some examples of dialog system processing are further described with reference to FIG. 4.

At operation 545, Dialog System Engine 120 generates a response and sends it to Dialog System Interface 130 associated with Dialog System Engine 120. Dialog System Interface 130 then displays and/or playbacks the response to the end user depending on predetermined settings.

FIGS. 6-9 illustrate various screenshots of platform interface 112 illustrating creating of dialog system rules.

Figure 6:
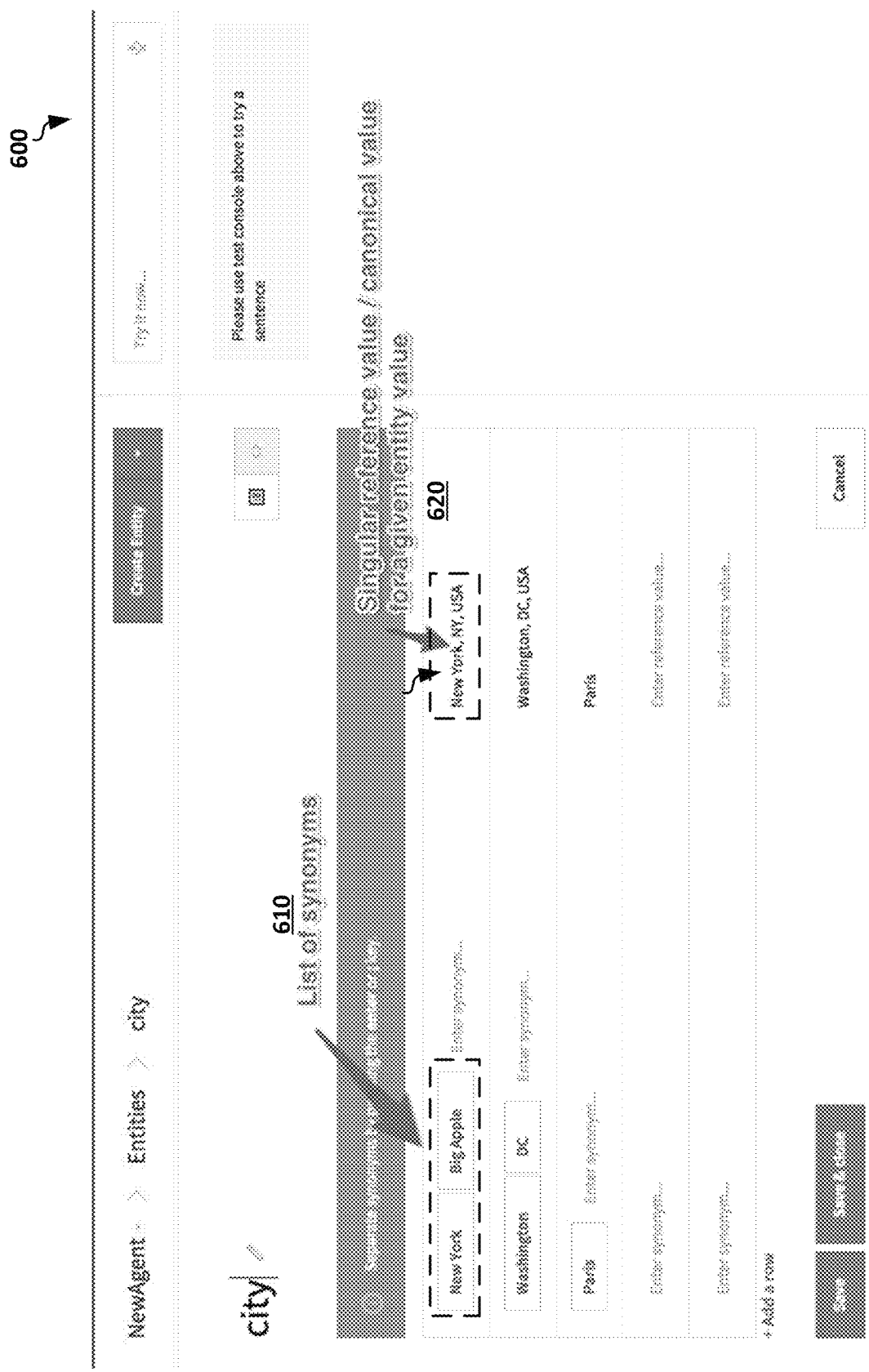
FIG. 6 shows the process of manual creating of entities for a dialog system rule, in accordance with some example embodiments.

FIG. 6 shows the process 600 of manual creating of entities via the platform interface 112. In one example, one set of entities may include definitions of geographical locations including city names such as "Atlanta," "Belfast," "Boston," "Chicago," "Detroit," and so forth. In another example, another set of entities may include time definitions such as "today," "tomorrow," "next week," "next Monday," "October 1," and the like. It shall be clear that the context database 270 may include multiple sets of entities each related to various activities.

As illustrated, the entity related to city may be associated with multiple values, for example New York, Washington, Paris, and so forth. Each of the values may include a list of synonyms 610 and a singular reference value/canonical value 620. A developer can manage (add, edit, delete) the values of an entity and the list of synonyms 610 for each value.

Figure 7:
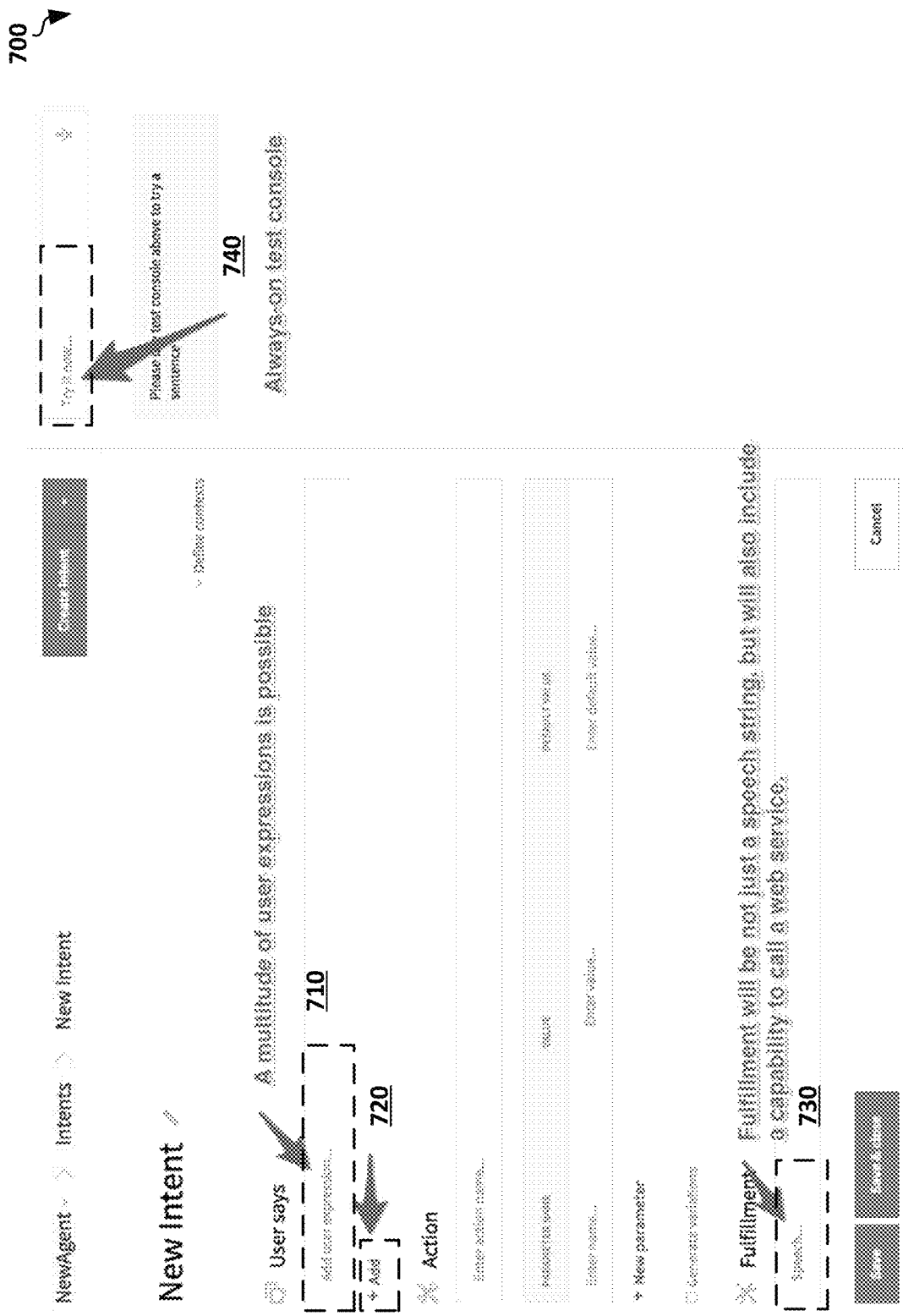
FIG. 7 shows the process of manual creating of intents via the platform interface, in accordance with some example embodiments.

FIG. 7 shows the process 700 of manual creating of intents for a dialog system rule. Intents can be provided as multiple sets of linguistic elements such as words or phrases associated with particular actions. Some examples of intents associated with the action of playing multimedia content may include "Play," "Start playback," "Activate playing," "Open," and so forth. Additionally, the context database 270 may also store multiple context words or phrases, such as "what about," "and how is it in," "and the same in," "and what about," and so forth, all associated with a particular dialog system rule. These context phrases can facilitate interpretation of user inputs. In some embodiments, the context database 270 may also store pre-built lexical data including, but not limited to, synonyms (words, phrases). In yet more embodiments, the context database 270 may also include pre-built knowledge databases such as WordNet or the like.

FIG. 7 illustrates an intent including a multitude of user expressions 710 identified automatically from exemplary phrases or specified by a developer, for example, by adding a new user expression using an Add control 720. On fulfillment 730 of the rule associated with the intent, the system may provide a speech string of call a web service. Additionally, a developer can test the rule execution using an always-on test console 740 by entering a test phrase.

FIG. 8 shows an example rule 800 for receiving a weather forecast. As illustrated, the rule 800 includes multiple user expressions 810 that can be used by the user to request a weather forecast, for example, "what is the weather in," "weather forecast for," and so forth. Entities, such as city or date, in user expressions can be provided using an alias 820 (or placeholder). Aliases can be referenced in action 830 and in fulfillment 840 section. A developer can manage user expressions 810, actions 830, and fulfillment 840 parameters.

New dialog system rules including intents and entities are stored in the rule database 260. One way to create new dialog system rules is a manual input of intents and entities, including specification of references to entities within intents. However, this approach may not be effective in certain instances and may have some disadvantages. For example, it can be very time consuming for developers to specify various natural language inputs to cover the wide range of inputs in which a certain user request can be made. The present technology addresses this problem by platform 110 automatically creating dialog system rules in response to receiving exemplary user requests from developers and/or analyzing requests from multiple dialog system users. Embodiments of this disclosure provide for context database 270 to be automatically populated with certain additional terms, keywords, phrases, and/or expressions using machine-learning and/or pattern recognition techniques when developers input exemplary user requests that potentially can be used by end users in the course of interaction with dialog system.

For example, developers may provide exemplary phrases such as "What is the weather like in New York," "What is the current temperature in Las Vegas," "What is the forecast for Washington D.C.," "How it is in Moscow," "Do I need my umbrella tomorrow," and so forth. These and other exemplary phrases can be provided via platform interface 112 and/or during the interaction of developer or end user with dialog system engines 120.

Figure 9:
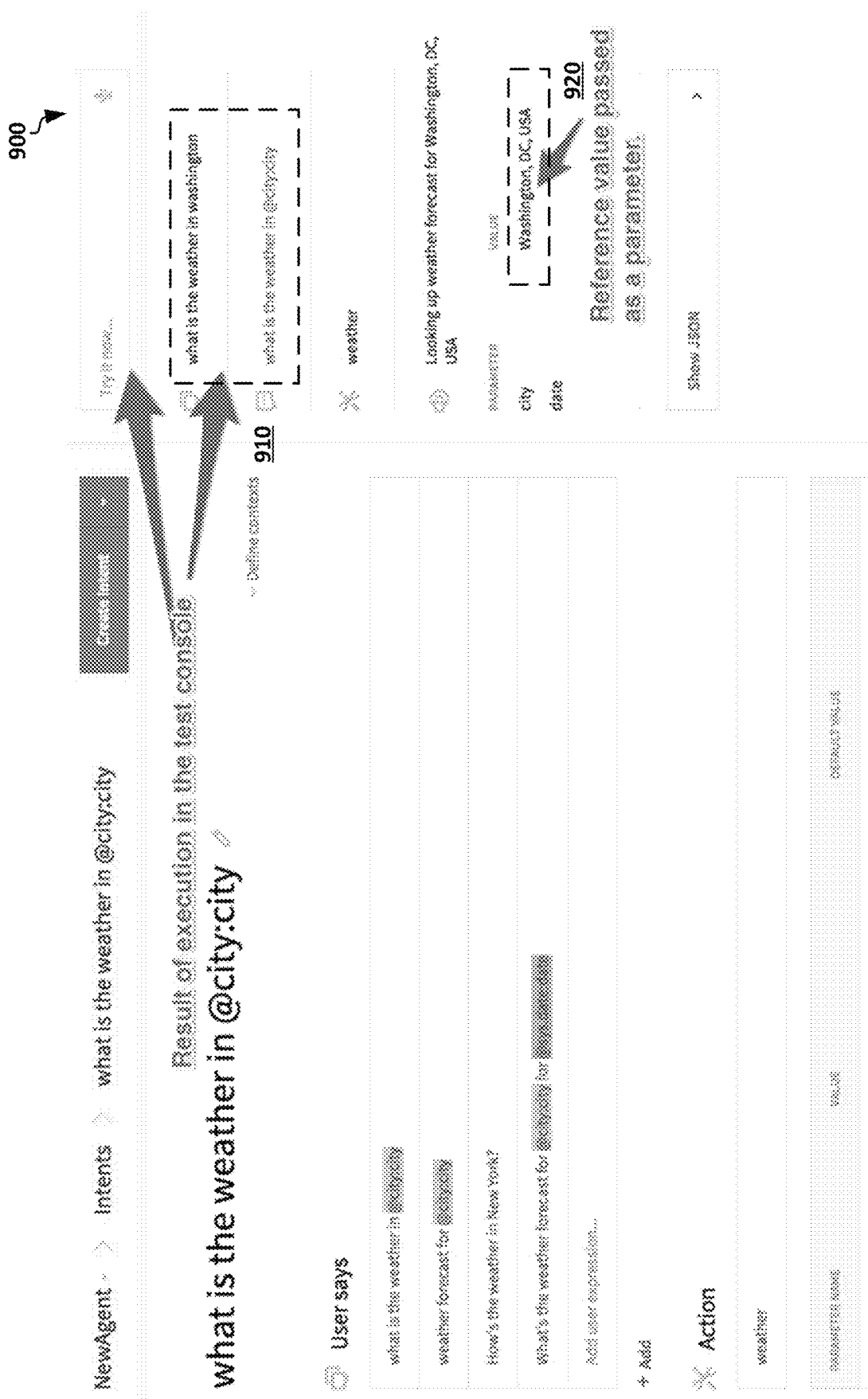
FIG. 9 shows a process of testing dialog system elements by developers, in accordance with some example embodiments.

FIG. 9 shows a process 900 of testing dialog system elements by developers. To test a rule, a developer can enter a test phrase in the test console. The test phrase may be processed 910 by the system to identify entities and intent in the test phrase. The result of the processing can be provided to the developer for review. Based on the processing, action associated with the intent may be provided as a response to the test phrase with reference values of the entities passed as a parameter 920. The developer can modify the intent according to the test results.

Once all dialog system elements of dialog system engine 120 are created, they can be maintained as a backend service and enable any of the associated dialog system interfaces 130 to provide the full functionality of the dialog system to users according to predetermined settings.

Figure 10:
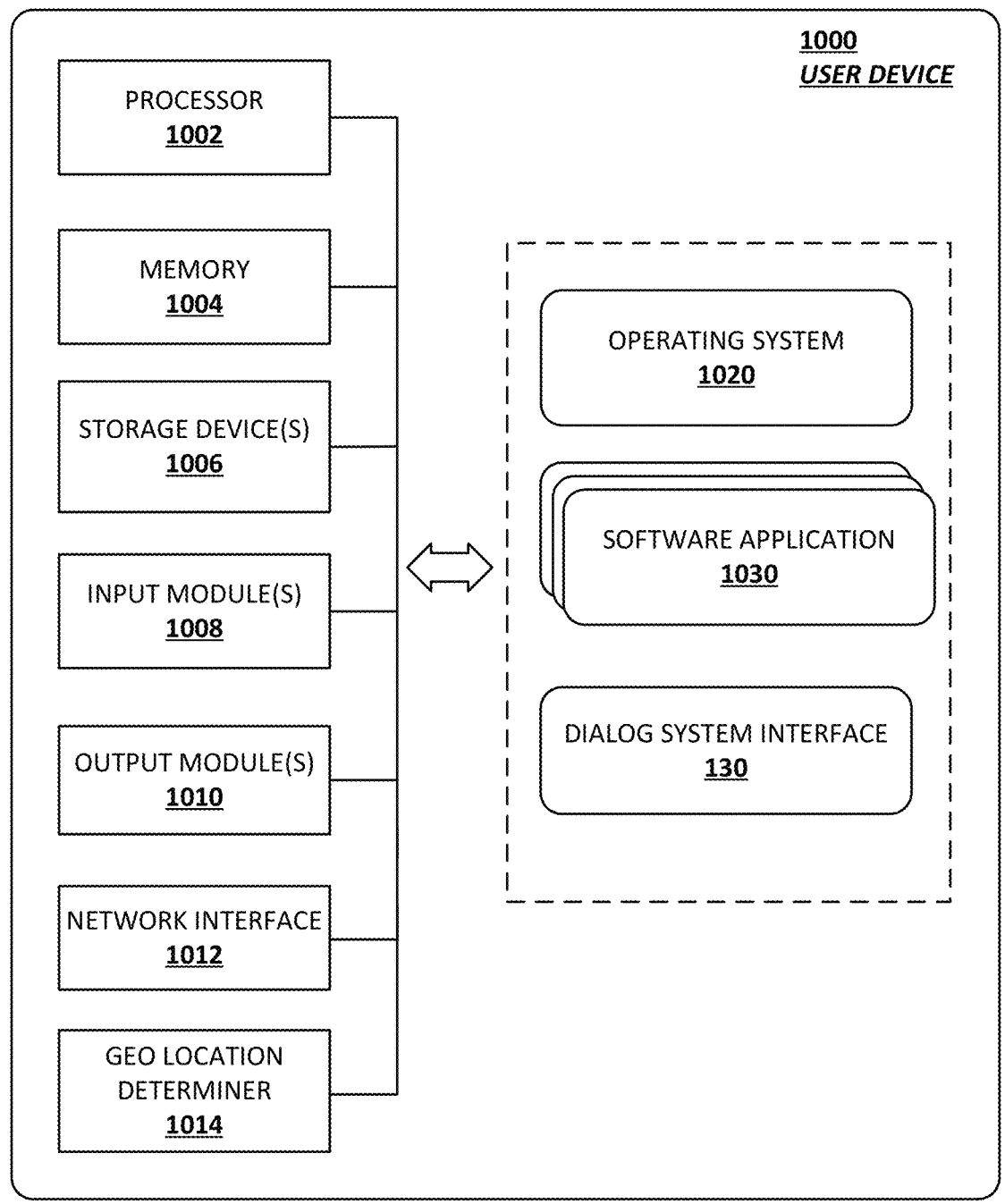
FIG. 10 is a high-level block diagram illustrating an example user device suitable for implementing the methods described herein.

FIG. 10 is a high-level block diagram illustrating an example user device 1000 suitable for implementing the methods described herein. It is worth mentioning that all components of the user device may include logic elements, hardware components, software (firmware) components, virtual components, or a combination thereof.

User device 1000 includes at least an integral part of one or more of a variety of types of devices and systems such as a general-purpose computer, desktop computer, server, computer network, network service, cloud-computing service, and so forth. Further, all modules shown in FIG. 10 may be operatively coupled using any suitable wired, wireless, radio, electrical, or optical standards. As already outlined above, user device 1000 may refer to a smart phone, wireless telephone, computer, such as a tablet computer or desktop computer, infotainment system, in-vehicle computing device, and the like.

As shown in FIG. 10, user device 1000 includes the following hardware components: one or more processors 1002, memory 1004, one or more storage devices 1006, one or more input modules 1008, one or more output modules 1010, network interface 1012, and optional geo location determiner 1014. User device 1000 also includes the following software or virtual components: an operating system 1020, one or more software (mobile) applications 1030, and Dialog System Interface 130, which can be a stand-alone software application or be integrated into one or more software applications 1030. Dialog System Interface 130 may provide a human-centric interface for accessing and managing information as discussed herein, communicating with Dialog System Engine 120, and communicating with web resources/services 160. According to various embodiments, Dialog System Interface 130 can be virtual, meaning it includes annotations integrated into a code of software applications 1030.

Processors 1002 are configured to implement functionality and/or process instructions for execution within user device 1000. For example, the processors 1002 may process instructions stored in memory 1004 and/or instructions stored on storage devices 1006. Such instructions may include components of an operating system 1020 and software applications 1030. The user device 1000 may also include one or more additional components not shown in FIG. 10, such as a housing, power supply, communication bus, and the like. These elements are omitted so as to not burden the description of present embodiments.

Memory 1004, according to one example embodiment, is configured to store information within the user device 1000 during operation. Memory 1004 may refer to a non-transitory computer-readable storage medium or a computer-readable storage device. In some examples, memory 1004 is a temporary memory, meaning that a primary purpose of memory 1004 may not be long-term storage. Memory 1004 may also refer to a volatile memory, meaning that memory 1004 does not maintain stored contents when memory 1004 is not receiving power. Examples of volatile memories include RAM, DRAM, SRAM, and other forms of volatile memories known in the art. In some examples, memory 1004 is used to store program instructions for execution by the processors 1002. Memory 1004, in one example embodiment, is used by software (e.g., the operating system 1020) or Dialog System Interface 130 executing on user device 1000 to temporarily store information during program execution. One or more storage devices 1006 can also include one or more transitory or non-transitory computer-readable storage media and/or computer-readable storage devices. In some embodiments, storage devices 1006 may be configured to store greater amounts of information than memory 1004. Storage devices 1006 may further be configured for long-term storage of information. In some examples, storage devices 1006 include non-volatile storage elements. Examples of such non-volatile storage elements include magnetic hard discs, optical discs, solid-state discs, flash memories, forms of electrically programmable memories (EPROM) or electrically erasable and programmable memories (EEPROM), and other forms of non-volatile memories known in the art.

Still referencing to FIG. 10, user device 1000 includes one or more input modules 1008. The input modules 1008 are configured to receive user inputs. Examples of input modules 1008 include a microphone, keyboard, keypad, mouse, trackball, touchscreen, touchpad, or any other device capable of detecting an input from a user or other source in the form of speech, audio, or tactile actions, and relaying the input to the user device 1000 or components thereof.

Output modules 1010, in some example embodiments, are configured to provide output to users through visual or auditory channels. Output modules 1010 may include a video graphics adapter card, liquid crystal display monitor, light emitting diode monitor, sound card, speaker, or any other device capable of generating output that may be intelligible to a user.

User device 1000, in some embodiments, includes network interface 1012. Network interface 1012 can be utilized to communicate with external devices, servers, and networked systems via one or more communications networks such as one or more wired, wireless, or optical networks including, for example, the Internet, intranet, LAN, WAN, cellular phone networks (e.g., GSM communications network, packet switching communications network, circuit switching communications network), Bluetooth radio, and an IEEE 802.11-based radio frequency network, among others. Network interface 1012 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as Universal Serial Bus (USB).

User device 1000 may further include optional geo location determiner 1014 for determining a current geographical location of the user device. Geo location determiner 1014 may utilize a number of different methods for determining geographical location including, for example, receiving and processing signals of Global Positioning Systems, GLONASS satellite navigation systems, or the Galileo satellite navigation system; utilizing multilateration of radio signals between radio towers (base stations); or utilizing geolocation methods associated with Internet Protocol addresses, Media Access Control addresses, Radio-Frequency Identification, or other technologies.

Operating system 1020 may control one or more functionalities of user device 1000 or components thereof. For example, operating system 1020 may interact with Dialog System Interface 130 and may further facilitate one or more interactions between software applications 1030 and one or more of processors 1002, memory 1004, storage devices 1006, input modules 1008, and output modules 1010. As shown in FIG. 10, operating system 1020 may interact with or be otherwise coupled to software applications 1030, Dialog System Interface 130, and components thereof. In some embodiments, Dialog System Interface 130 can be included into the operating system 1020 and/or software applications 1030. Notably, user device 1000 and its components such as the Dialog System Interface 130, may also interact with one or more remote storage or computing resources including, for example, web resources, websites, social networking websites, blogging websites, news feeds, email servers, web calendars, event databases, ticket aggregators, map databases, points of interest databases, and so forth.

Figure 11:
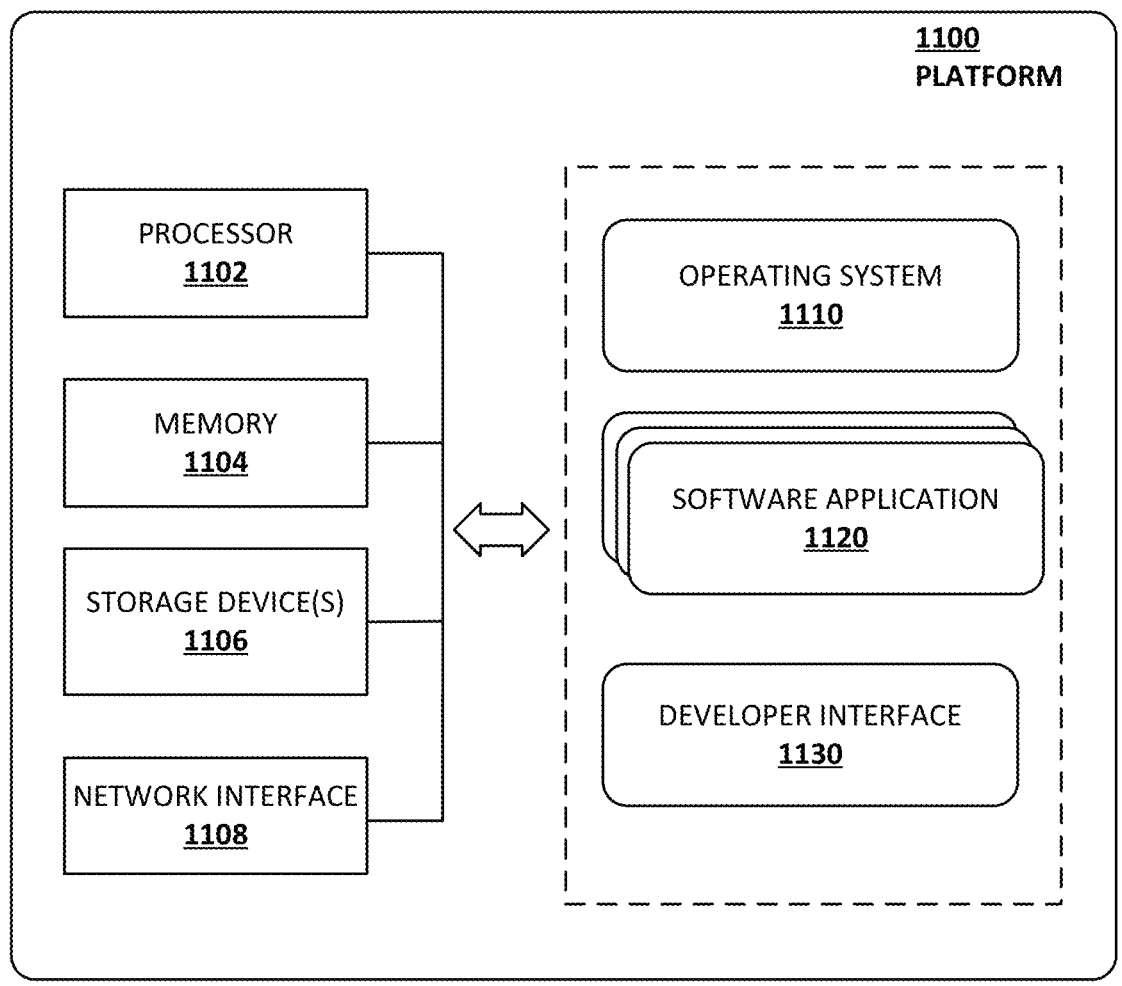
FIG. 11 is a high-level block diagram illustrating an example system suitable for implementing the methods described herein.

FIG. 11 is a high-level block diagram illustrating an example system 1100 suitable for implementing the methods described herein. In particular, system 1100 is a server-based solution suitable for running platform 110.

Note that all components of system 1100 include logic elements, hardware components, software (firmware) components, virtual components, or a combination thereof. System 1100 may include, relate, or constitute an integral part of one or more of a variety of types of devices and systems such as a general-purpose computer, server, web server, network service, cloud-computing service, and so forth. Further, all modules shown in FIG. 11 may be operatively coupled using any suitable wired, wireless, radio, electrical, or optical standards.

As shown in FIG. 11, system 1100 includes the following hardware components: one or more processors 1102, memory 1104, one or more storage devices 1106, and network interface 1108. System 1100 also includes the following software or virtual components: operating system 1110, one or more software applications 1120, and developer interface 1130 such as platform interface 112. The developer interface 1130 may provide a human-centric interface for accessing and managing information as discussed herein.

In some embodiments, processors 1102 are configured to implement functionality and/or process instructions for execution within the system 1100. For example, processors 1102 may process instructions stored in memory 1104 and/or instructions stored on storage devices 1106. Such instructions may include components of operating system 1110, software applications 1120, and/or developer interface 1130.

Memory 1104, according to one example embodiment, is configured to store information within system 1100 during operation. Memory 1104, in some example embodiments, may refer to a non-transitory computer-readable storage medium or a computer-readable storage device. In some examples, memory 1104 is a temporary memory, meaning that a primary purpose of memory 1104 may not be long-term storage. Memory 1104 may also refer to a volatile memory, meaning that memory 1104 does not maintain stored contents when memory 1104 is not receiving power. Examples of volatile memories include RAM, DRAM, SRAM, and other forms of volatile memories known in the art. In some examples, memory 1104 is used to store program instructions for execution by the processors 1102. Memory 1104, in one example embodiment, is used to temporarily store information during program execution.

One or more storage devices 1106 can also include one or more transitory or non-transitory computer-readable storage media and/or computer-readable storage devices. In some embodiments, storage devices 1106 may be configured to store greater amounts of information than memory 1104.

Storage devices 1106 may further be configured for long-term storage of information. In some examples, the storage devices 1106 include non-volatile storage elements. Examples of such non-volatile storage elements include magnetic hard discs, optical discs, solid-state discs, flash memories, forms of EPROM or EEPROM, and other forms of non-volatile memories known in the art. In one example, one or more storage devices 1106 can include the databases 260, 270, 280 on FIG. 2. In other embodiments, one or more storage devices 1106 can store and maintain user profiles and custom Dialog System Engines 120.

Still referencing to FIG. 11, system 1100 includes network interface 1108. Network interface 1108 can be utilized to communicate with external devices, servers, and networked systems via one or more communications networks such as one or more wired, wireless, or optical networks including, for example, the Internet, intranet, LAN, WAN, cellular phone networks (e.g. GSM communications network, packet switching communications network, circuit switching communications network), Bluetooth radio, and an IEEE 802.11-based radio frequency network, among others. Network interface 1108 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as USB.

Operating system 1110 may control one or more functionalities of system 1100 or components thereof. For example, operating system 1110 may interact with the developer interface 1130, and may further facilitate one or more interactions between software applications 1120 and one or more of processors 1102, memory 1104, storage devices 1106, and/or network interface 1108. As shown in FIG. 11, operating system 1110 may interact with or be otherwise coupled to the developer interface 1130 and components thereof. Notably, system 1100 and its components may also interact with one or more remote storage or computing resources (such as those shown on FIG. 1 as web resources/services 160) including, for example, web resources, websites, social networking websites, blogging websites, news feeds, email servers, web calendars, event databases, ticket aggregators, map databases, points of interest databases, and so forth. Software applications 1120, in essence, may provide functionality to platform 110 and enable its operation. Alternatively, software applications may be additions to platform 110.

Thus, methods and systems for expanding software application functions by adding annotations to software code have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for expanding software application functionalities, the system comprising:
    at least one processor operable to:
        load metadata to a dialog system during runtime of a software application,
            wherein the metadata loaded to the dialog system is included in, and loaded to the dialog system from, source code annotations that are integrated into source code of the software application,
            wherein the source code annotations integrated into the source code of the software application define portions of the source code of the software application to be invoked when one or more actions are triggered within the dialog system while the software application is running,
            wherein the metadata links one or more functions of the dialog system to one or more functions of the software application when the software application is running, and
            wherein the metadata defines an association of a particular source code annotation, of the source code annotations, to an intent and/or to a predetermined word or phrase;
        subsequent to loading the metadata, receive, via a dialog system interface of the dialog system, a user request within the software application, wherein the dialog system interface is embedded in a plurality of software applications, including the software application, installed on a user device;
        send, by the dialog system interface embedded in the software application installed on the user device and to the dialog system, at least a part of the user request;
        receive, by the dialog system interface embedded in the software application and from the dialog system, a dialog system response to the user request,
            wherein the dialog system response specifies the particular source code annotation of the source code annotations of the software application based on the dialog system processing the user request to determine that the user request includes the intent and/or the predetermined word or phrase, that is associated with the particular source code annotation in the source code of the software application, and based on the association being included in the metadata of the source code annotations loaded to the dialog system; and
        identify, based on the particular source code annotation, a particular portion of the source code of the software application that is associated with the particular source code annotation,
            wherein the association between the particular portion of the source code and the particular source code annotation is defined within the source code of the software application;
        invoke, by the dialog system interface embedded in the software application installed on the user device, the particular portion of the source code within the software application
            wherein invoking the particular portion of the source code is responsive to both: the received dialog system response specifying the particular source code annotation, and the particular portion of the source code being associated with the particular source code annotation within the source code of the software application,
            wherein invoking the particular portion of the source code causes the software application to perform one or more actions, and
            wherein one or more of the actions correspond to one or more of the functions, of the software application, that are linked to the particular source code annotation; and
    a database in communication with the at least one processor comprising computer-readable instructions for execution by the processor.

2. The system of claim 1, wherein the particular portion of the source code of the software application includes an instruction for one or more of the following: a further software application associated with the user device, a server, a hosting service, a web service, a web site, and a cloud service.

3. The system of claim 1, wherein the dialog system response further includes presentation of one or more of a displayable message, an audio message, or an incentive for a user to provide a further user request via an output renderer.

4. The system of claim 1, wherein the source code annotations include one or more of the following: pre-built annotations, annotations uploaded from a remote resource, and annotations synchronized with an online resource.

5. The system of claim 1, wherein the dialog system response further includes a callback Uniform Resource Locator to be accessed by the software application to obtain a text of the dialog system response.

6. A method for expanding software application functionalities, the method being performed by at least one processor and a memory, the method comprising:
loading metadata to a dialog system during runtime of a software application,
wherein the metadata loaded to the dialog system is included in, and loaded to the dialog system from, source code annotations that are integrated into source code of the software application,
wherein the source code annotations integrated into the source code of the software application define portions of the source code of the software application to be invoked when one or more actions are triggered within the dialog system while the software application is running,
wherein the metadata links one or more functions of the dialog system to one or more functions of the software application when the software application is running, and
wherein the metadata defines an association of a particular source code annotation, of the source code annotations, to an intent and/or to a predetermined word or phrase;
subsequent to loading the metadata, receiving, via a dialog system interface of the dialog system, a user request within the software application when the software application is running, wherein the dialog system interface is embedded in a plurality of software applications, including the software application, installed on a user device;
sending, by the dialog system interface embedded in the software application installed on the user device and to the dialog system, at least a part of the user request;
receiving, from the dialog system, a dialog system response to the user request,
wherein the dialog system response specifies the particular source code annotation of the source code annotations of the software application based on the dialog system processing the user request to determine that the user request includes the intent and/or the predetermined word or phrase, that is associated with the particular source code annotation in the source code of the software application, and based on the association being included in the metadata of the source code annotations loaded to the dialog system; and
identifying, based on the particular source code annotation, a particular portion of the source code of the software application that is associated with the particular source code annotation,
wherein the association between the particular portion of the source code and the particular source code annotation is defined within the source code of the software application;
invoking, by the dialog system interface embedded in the software application installed on the user device, the particular portion of the source code within the software application,
wherein invoking the particular portion of the source code is responsive to both: the received dialog system response specifying the particular source code annotation, and the particular portion of the source code being associated with the particular source code annotation within the source code of the software application,
wherein invoking the particular portion of the source code causes the software application to perform one or more actions, and
wherein one or more of the actions correspond to one or more of the functions, of the software application, that are linked to the dialog system in the particular source code annotation.

7. The method of claim 6, wherein the particular portion of the source code of the software application includes an instruction for one or more of the following: a further software application associated with the user device, a server, a hosting service, a web service, a web site, and a cloud service.

8. The method of claim 6, wherein the dialog system response further includes presentation of one or more of a displayable message, an audio message, or an incentive for a user to provide a further user request via an output renderer.

9. The method of claim 6, wherein the source code annotations include one or more of the following: pre-built annotations, annotations uploaded from a remote resource, and annotations synchronized with an online resource.

10. The method of claim 6, wherein the dialog system response further includes a callback Uniform Resource Locator to be accessed by the software application to obtain a text of the dialog system response.

11. The method of claim 6, wherein the source code annotations define at least a type of the user request, the user request being processed by the dialog system based at least on the type of the user request.

12. A non-transitory processor-readable medium having instructions stored thereon, which when executed by one or more processors, cause the one or more processors to implement a method, comprising:
loading metadata to a dialog system during runtime of a software application,
wherein the metadata loaded to the dialog system is included in, and loaded to the dialog system from, source code annotations that are integrated into source code of the software application,
wherein the source code annotations integrated into the source code of the software application define portions of the source code of the software application to be invoked when one or more actins are triggered within the dialog system while the software application is running,
wherein the metadata links one or more functions of the dialog system to one or more functions of the software application when the software application is running, and wherein the metadata defines an association of a particular source code annotation, of the source code annotations, to an intent and/or to a predetermined word or phrase;

subsequent to loading the metadata, receiving, via a dialog system interface of the dialog system, a user request within the software application when the software application is running, wherein the dialog system interface is embedded in a plurality of software applications, including the software application, installed on a user device, sending, by the dialog system interface embedded in the software application installed on the user device and to the dialog system, at least a part of the user request;

receiving, by the dialog system interface embedded in the software application installed on the user device and from the dialog system, a dialog system response to the user request, wherein the dialog system response specifies the particular source code annotation of the source code annotations of the software application based on the dialog system processing the user request to determine that the user request includes the intent and/or the predetermined word or phrase, that is associated with the particular source code annotation in the source code of the software application, and based on the association being included in the metadata of the source code annotations loaded to the dialog system; and identifying, based on the particular source code annotation, a particular portion of the source code of the software application that is associated with the particular source code annotation, wherein the association between the particular portion of the source code and the particular source code annotation is defined within the source code of the software application;

invoking, by the dialog system interface embedded in the software application installed on the user device, the particular portion of the source code within the software application, wherein invoking the particular portion of the source code is responsive to both: the received dialog system response specifying the particular source code annotation, and the particular portion of the source code being associated with the particular source code annotation within the source code of the software application, wherein invoking the particular portion of the source code causes the software application to perform one or more actions, and wherein one or more of the actions correspond to one or more of the functions, of the software application, that are linked to the dialog system in the particular source code annotation.

13. The method of claim 6, wherein the dialog system is a third party service, and wherein receiving the dialog system response to the user request from the third party service comprises:

incorporating additional information from the third party service into the dialog system response, and providing the additional information for presentation to a user via a graphical user interface of the dialog system.

14. The system of claim 1, wherein the source code annotations of the source code of the software application are provided within the source code of the software application during design of the software application, and wherein the source code annotations are specific to the software application.

15. The system of claim 1, wherein invoking the particular portion of the source code causes the software application installed on the user device to perform one or more of the actions using a further software application installed on the user device.

16. The system of claim 1, wherein invoking the particular portion of the source code causes the software application installed on the user device to control one or more components of the user device.

17. The system of claim 1, wherein the metadata defines the association of the identified annotation to the intent, and wherein the association of the particular source code annotation to the intent is defined, for the software application, by a developer during design of the software application using example user requests indicative of the intent.

18. The system of claim 1, wherein the software application is installed on an operating system, and wherein the operating system facilitates interactions between the software application installed on the operating system and the dialog system.

* * * * *